US009329738B2

(12) United States Patent
Yousefpor et al.

(10) Patent No.: US 9,329,738 B2
(45) Date of Patent: May 3, 2016

(54) DETERMINATION AND REDUCTION OF PARASITIC CAPACITANCE VARIATION DUE TO DISPLAY NOISE

(71) Applicant: Apple Inc., Cupertino, CA (US)

(72) Inventors: Marduke Yousefpor, San Jose, CA (US); Stephen S. Poon, San Jose, CA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 14/023,118

(22) Filed: Sep. 10, 2013

(65) Prior Publication Data

US 2014/0071087 A1      Mar. 13, 2014

Related U.S. Application Data

(60) Provisional application No. 61/699,150, filed on Sep. 10, 2012.

(51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01)

(58) Field of Classification Search
CPC ................................ G06F 3/044; G06F 3/0418
USPC .......................................... 345/174; 178/18.06
See application file for complete search history.

(56) References Cited

U.S. PATENT DOCUMENTS

| | | | | |
|---|---|---|---|---|
| 5,877,512 A | * | 3/1999 | Kim | ................................. 257/57 |
| 6,134,513 A | * | 10/2000 | Gopal | ............................. 703/14 |
| 6,333,771 B1 | * | 12/2001 | Matoba et al. | ................ 349/139 |
| 6,449,754 B1 | * | 9/2002 | You | ..................... G06F 17/5036 716/115 |
| 8,599,167 B2 | * | 12/2013 | Joharapurkar | ........ G06F 3/0418 178/18.01 |
| 2002/0043674 A1 | * | 4/2002 | Haga et al. | ..................... 257/294 |
| 2004/0123257 A1 | * | 6/2004 | Chang et al. | ....................... 716/5 |
| 2006/0043375 A1 | * | 3/2006 | Takasugi | .............. G09G 3/3233 257/72 |
| 2006/0227114 A1 | * | 10/2006 | Geaghan | ................. G06F 3/044 345/173 |
| 2010/0050585 A1 | * | 3/2010 | Amaro | .................... A01D 46/24 56/13.5 |
| 2010/0060602 A1 | * | 3/2010 | Agari | ...................... G06F 3/044 345/173 |
| 2010/0060610 A1 | * | 3/2010 | Wu | ................................. 345/174 |
| 2011/0193817 A1 | * | 8/2011 | Byun et al. | ..................... 345/174 |
| 2011/0285661 A1 | * | 11/2011 | Hotelling | ........................ 345/174 |
| 2012/0182251 A1 | * | 7/2012 | Krah | ............................. 345/174 |
| 2014/0285462 A1 | * | 9/2014 | Lee | .............................. 345/173 |

* cited by examiner

*Primary Examiner* — Temesgh Ghebretinsae
*Assistant Examiner* — Benyam Ketema
(74) *Attorney, Agent, or Firm* — Zachary D. Hadd

(57) ABSTRACT

Embodiments described herein generally take the form of methods and systems for identifying and/or reducing a parasitic capacitance variation in a capacitive integrated touch-sensing module that may arise from proximity to a nearby electronic display.

17 Claims, 14 Drawing Sheets

DETERMINATION AND REDUCTION OF PARASITIC CAPACITANCE VARIATION DUE TO DISPLAY NOISE

CROSS-REFERENCE TO RELATED APPLICATION

Embodiments discussed herein relate generally to methods and systems to determine and reducing parasitic capacitance variations in a capacitive integrated touch sensing module, and more particularly to methods and systems for determining and reducing parasitic capacitance variations resulting from noise due to display pixels or other active elements in an electronic display.

TECHNICAL FIELD

Embodiments discussed herein relate generally to methods and systems to determine and reducing parasitic capacitance variations in a capacitive integrated touch sensing module, and more particularly to methods and systems for determining and reducing parasitic capacitance variations resulting from noise due to display pixels or other active elements in an electronic display

BACKGROUND

Liquid crystal displays (LCDs) generally display images by transmitting or blocking light through the action of liquid crystals. LCDs have been used in a variety of computing displays and devices, including notebook computers, desktop computers, tablet computing devices, mobile phones (including smart phones) automobile in-cabin displays, on appliances, as televisions, and so on. LCDs often use an active matrix to drive liquid crystals in a pixel region. In some LCDs, a thin-film transistor (TFT) is used as a switching element in the active matrix.

FIG. 1 illustrates a perspective view of a sample electronic device, such as a tablet computer. The electronic device includes a touch screen display 100 enclosed by a housing 138. The touch screen display 100 incorporates a touch panel 102 (also referred to as a touch-sensing module) and an LCD, although alternative embodiments may employ an OLED layer instead of an LCD. The LCD is not shown in FIG. 1. Although a tablet computing device is illustrated in FIG. 1, it should be appreciated that the discussion herein may be equally applicable to any display and/or electronic device incorporating a display, such as a smart phone or other mobile phone, notebook or laptop computer, all-in-one computing device, personal digital assistant, multimedia player, e-book reader, touch-sensitive display for an automobile or appliance, GPS device, and so on.

FIG. 2A illustrates a simplified cross-sectional view of a sample tablet computing device shown in FIG. 1 (the cross-section is shown by arrows 2-2 in FIG. 1). LCD 204 includes an array of pixels and an array of TFTs associated with the pixels. The LCD 204 may be coupled to the touch panel 102 by an optically clear adhesive (OCA) 206 or may have an air gap from the touch panel. In some embodiments, the LCD 204 may be adjacent to, or co-planar with, the touch panel (also referred to herein as a touch-sensing module).

The LCD 204 may suffer from display noise, which may cross-couple to the integrated capacitive touch sensing sub-system of the tablet computing device or other electronic device. For example, the capacitance between the gate and drain of a TFT for a given display pixel may vary with a voltage between a gate and a drain, which depends upon the image being displayed. Other factors can affect the capacitance between the gate and drain of a TFT such as changes in the gate voltage, the display temperature, and the like. The change in the gate and drain parasitic capacitance acts like a display noise and may interfere with detection of touches or other capacitive sense events during operation. The display noise in the LCD 204 may be sensitive to a finger touching the touch panel 102. The impact of finger touches may vary with the user and/or environment in which the device is used. For example, a human finger may be relatively cold or warm. The device 100 may be used in a hot and humid environment, or a cold and dry environment, all of which may change the sensitivity of the LCD to display noise.

SUMMARY

Embodiments discussed herein generally take the form of methods and systems for identifying and/or reducing a parasitic capacitance variation in a capacitive integrated touch-sensing module that may arise from proximity to a nearby electronic display.

One embodiment may take the form of a method for reducing a parasitic capacitance between a display and a capacitive-touch sensing panel; comprising: generating an admittance model of a plurality of parasitic capacitances between plurality of pixels; varying one or more of the plurality of parasitic capacitances in the admittance model; determining if the variance of the one or more of plurality of parasitic capacitances reduces an overall parasitic capacitance between the display and the capacitive-touch sensing panel; and if so, implementing the variance in at least one of the capacitive-touch sensing panel and the display.

DETAILED DESCRIPTION

Embodiments discussed herein generally take the form of methods and systems for identifying and/or reducing a parasitic capacitance in a capacitive touch-sensing module that may arise from proximity to a nearby electronic display. Generally, pixels in such displays (which may be liquid crystal displays, light emitting diode displays, organic light-emitting diode displays, and so on) include at least one thin film transistor (TFT) that operates the pixel. In many cases, each pixel may include three TFTs, one each for red, green and blue sub-pixels. In some cases, each pixel may have even more associated TFTs.

Figure 1:
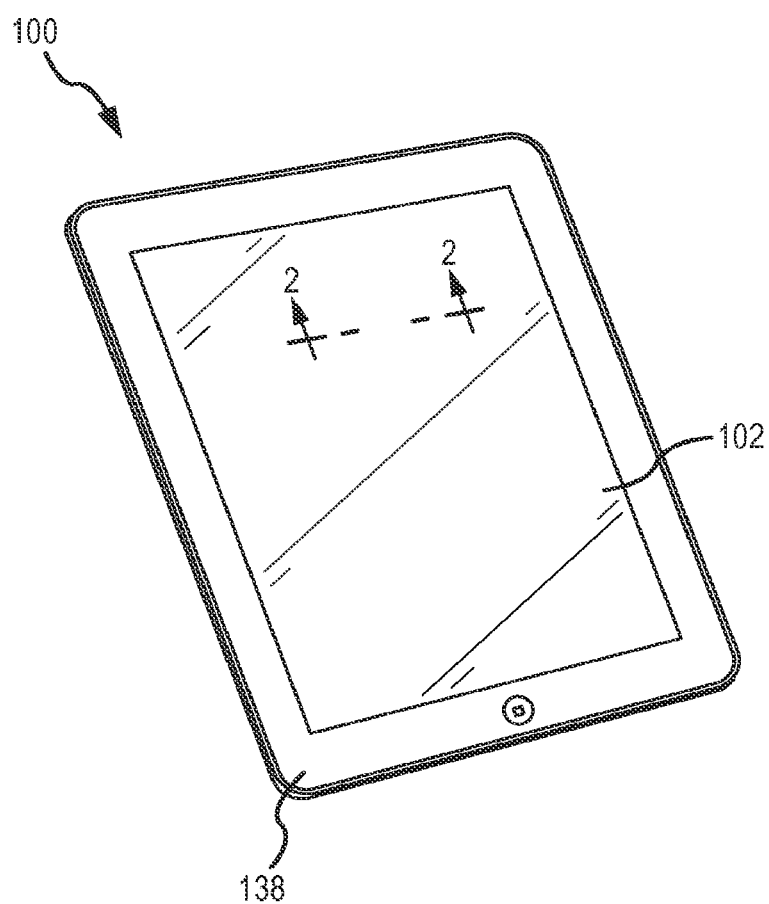
FIG. 1 illustrates a perspective view of a sample tablet computing device.

In many modern electronic devices, such as tablet computing devices, smart phones, all-in-one computing systems and the like, an integrated display and touch-sensing module may be incorporated. Although a tablet computing device is illustrated in FIG. 1, it should be appreciated that the discussion herein may be equally applicable to any display and/or electronic device incorporating a display, such as a smart phone or other mobile phone, notebook or laptop computer, all-in-one computing device, personal digital assistant, multimedia player, e-book reader, touch-sensitive display for an automobile or appliance, GPS device, and so on.

Figure 2A:
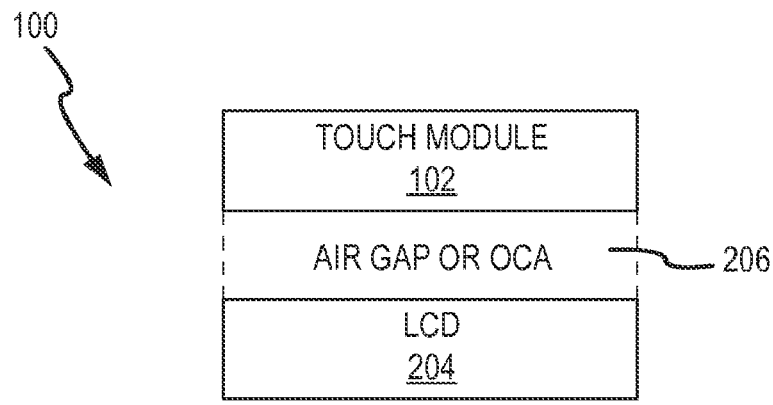
FIG. 2A is a cross-section taken along line 2-2 of FIG. 1, showing a first sample cross-section of a first sample embodiment.

The display may be separated from a capacitive touch-sensing module by a relatively thin air gap, as shown in FIG. 2A. In other embodiments, the display may directly overlay or abut the touch-sensing module, as shown generally in FIG. 5 and discussed in further detail below. In either case, the proximity of the display and touch-sensing module may give rise to the parasitic capacitance in the touch-sensing module generated by the TFTs of the display, as described above.

Figure 2B:
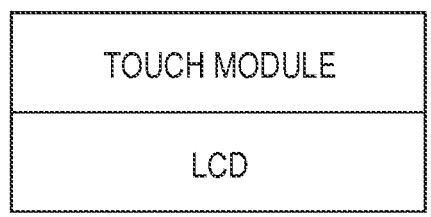
FIG. 2B is a cross-section taken along line 2-2 of FIG. 1, showing a second sample cross-section of a second sample embodiment.

FIG. 2B illustrates a second simplified cross-sectional view of a sample computing device as shown in FIG. 1, again along line 2-2. As can be seen in this embodiment, there is no air gap between the touch module and the display.

Figure 2C:
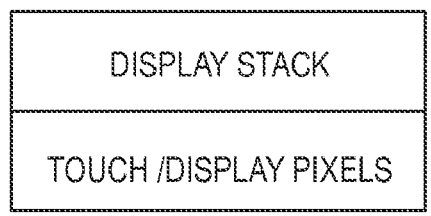
FIG. 2C is a cross-section taken along line 2-2 of FIG. 1, showing a third sample cross-section of a third sample embodiment.

Yet a third embodiment is shown in FIG. 2C. In this embodiment, the touch-sensing module is co-planar with, and integrated with, the display pixels. A display stack may overlay the integrated touch-sensing module and display. The display stack may include a variety of layers, such as cover glass, adhesive (such as a pressure-sensitive adhesive), one or more polarizers, one or more color filters, one or more glass layers, a liquid crystal layer, and so on.

As mentioned above, the parasitic capacitance created by a display pixel (or red, green, and/or blue sub-pixel of the display pixel) may cause a false indication of a touch on an adjacent or nearby portion of a capacitive touch-sensing display module. Further, it may be difficult to determine how to compensate for such a parasitic capacitance as there are multiple sources for the overall parasitic capacitance. As an example, there are multiple thin-film transistors associated with any given display pixel, all or any of which may contribute to the overall parasitic capacitance. Likewise, the construction of the touch-sensing module itself may enhance parasitic capacitances with a display pixel (or pixels). There are several other aspects of both the display pixels and touch-sensing module components that affect the parasitic capacitance between the two. Accordingly, constructing a generalized set of models of the display pixels and the touch regions of a touch-sensing module may facilitate in measuring, identifying and ultimately reducing parasitic capacitances in the touch-sensing module, and thus ultimately improving the performance and/or sensitivity thereof.

Generally, it is uncommon to model the individual pixels of a display panel as an RC network. The same is true for the distinct touch regions of a capacitive-sensing touch module. Modeling the overall display panel and/or touch sensing module separately may be insufficient to determine the exact cause of parasitic capacitances, let alone how to minimize or reduce them. Accordingly, it may be useful to model both display pixels and a touch region as an integrated RC networks, and then use these models to determine the capacitive effects of one on the other.

In determining the effects of parasitic capacitance, it may likewise be useful to view the effects as phasors. By representing the capacitance of a touch region and the parasitic capacitance of a nearby display pixel as a phasor, the magnitude of one with respect to the other may be more easily discerned. Thus, the impact of one on the other may be more readily determined. Likewise, as certain aspects of the touch region and/or display pixel are changed (such as the shielding, doping and the like of certain nodes of the display pixel and/or associated thin film transistor), the magnitude of the parasitic capacitance may vary. This variance may be more easily seen when the capacitance is represented as a phasor. Accordingly, it may be simpler to determine the overall effect of structural changes on parasitic capacitance.

It should be appreciated that large-scale displays and capacitive touch-sensing modules may have a very large number of display pixels and/or touch regions. Accordingly, employing standard RC models of a pixel and/or touch region may prove extremely complicated when modeling the interaction of the two, especially with respect to parasitic capacitance. Thus, it may be useful to simplify the models of one or both of the pixel and region. In some embodiments, this simplification may be performed by generating an admittance model of the pixel and/or region. The admittance model may give a generally good representation of an RC network without the accompanying complexity. Essentially, the number of capacitors in an RC network of the size and scale that would be necessary to represent a display panel of a modern electronic device may be so great that an extremely high number of parasitic capacitive effects may be introduced, on the order of hundreds of thousands to hundreds of millions. The processing power necessary to determine overall parasitic capacitance between a display and a touch-sensing module with RC models may thus be excessive. Likewise, the time necessary to perform computations with such models may be very long (e.g., on the order of days, weeks or more). Simplifying the models to an admittance model for a basic touch size unit of the display (e.g., a touch region) and reusing a basic block model to reconstruct the entire display model may reduce the number of cross-capacitive effects, thereby simplifying the processing power and reducing the time necessary to perform an overall simulation. Further, the error of such simulations has proven to be relatively small.

An overview of a display pixel and its capacitances will now be discussed. Essentially, each pixel includes three sub-pixels, and each sub-pixel includes four major nodes. These nodes are the VCOM node, the PIXEL node, the DATA node, and the GATE node. The DATA node is the source side of the pixel TFT and is connected to data source lines of the display. The PIXEL node is connected to the drain side of the pixel TFT, which is connected to one side of the display pixel storage capacitor of a given RGB sub-pixel. The VCOM node is connected to other side of the display pixel storage capacitor. Finally, the GATE node is connected to the display pixel TFT gate. Generally, each sub-pixel of a given pixel shares the VCOM and GATE nodes, while the DATA and PIXEL nodes are unique to each sub-pixel.

A storage capacitance exists between the PIXEL and VCOM node of each sub-pixel. This storage capacitance stores a charge that controls the transmittance of at least a portion of the liquid crystal of the display corresponding to the pixel in question. The GATE node control the operation (e.g., on/off state) of a TFT defined between the PIXEL and DATA nodes. When these TFTs are on, the VCOM and DATA line differential potential sets the charge that is stored on the aforementioned storage capacitances for each pixel. When the TFT is off, the storage capacitances are maintained until the display is refreshed.

Figure 3:
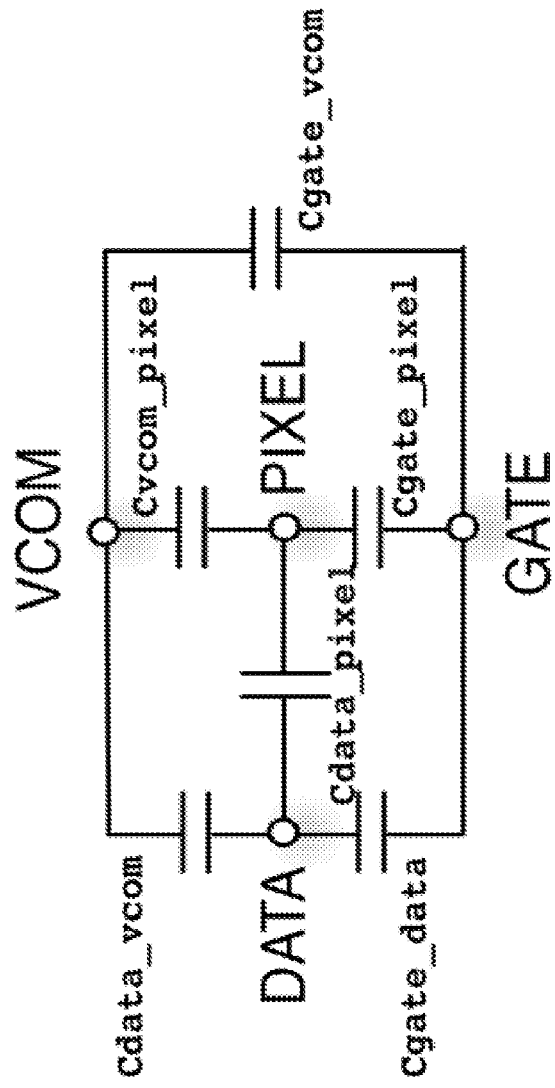
FIG. 3 is a circuit diagram modeling the capacitances of the three sub-pixels of any given pixel.

Generally, FIG. 3 is a circuit diagram modeling the capacitances of the three sub-pixels of any given pixel. As can be seen, a parasitic capacitance exists between any two given nodes.

It should be appreciated that the display and touch-sensing module may operate during different periods. That is, the display is generally updated when the touch-sensing module is not scanning to detect a touch, and the touch-sensing module operates to detect a touch while the display is not updated. As one example, the touch-sensing module may actively operate during the blanking interval of the display.

Thus, while the touch-sensing module is operating, the display is in its blanking period and the associated TFTs are off. Since the TFTs are in an off state, the PIXEL nodes float with respect to system ground, permitting simplification of the parasitic capacitances into the circuit shown in FIG. 3. It should be appreciated that FIG. 3 shows a generalized circuit diagram for a generalized pixel of a display; certain pixels near the boundary of a display or located at or near boundaries of the drive and sense lines of the touch-sensing module may have slightly different parasitic capacitance models. Nonetheless, the model shown in FIG. 3 generally suffices to model the parasitic capacitances of the overall display system.

Figures 4A, 4B:
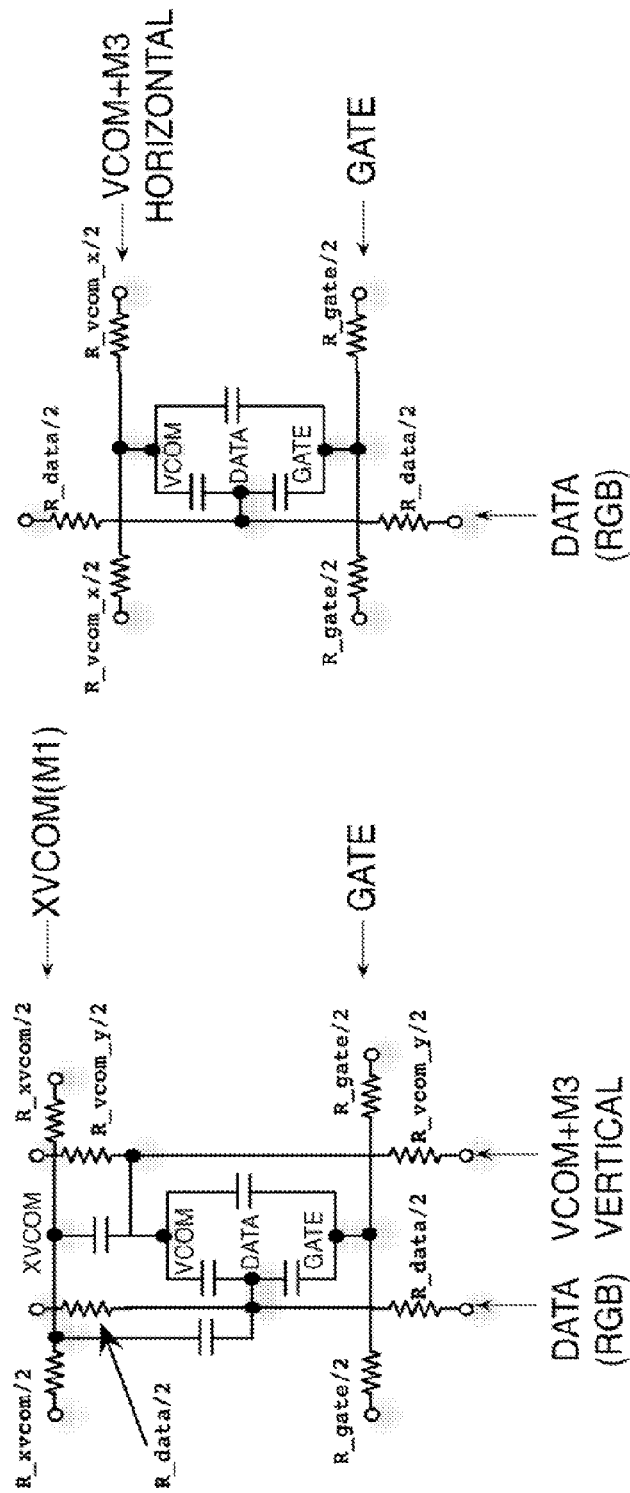
FIG. 4A generally depicts the parasitic resistance for RGB pixels located in touch guard and sense areas.
FIG. 4B shows the parasitic resistance for an RGB pixel located in a touch drive area.

In addition to the parasitic capacitances, each RGB pixel may be modeled as an RC network. To simplify the RC model of the pixels, a centered node capacitance model is used where the net resistance is split into two equal halves between a centered internal node and an external node of the model, as shown in FIGS. 4A and 4B. FIG. 4A generally depicts the parasitic resistance for RGB pixels located in touch guard and sense areas, while FIG. 4B shows the parasitic resistance for an RGB pixel located in a touch drive area. It should be appreciated that the RC models shown in FIGS. 4A and 4B may vary between embodiments, and so what is shown may be an appropriate model only for a sample embodiment. The general concept of modeling each pixel as an RC network, however, may be used between embodiments. Likewise, the concept of modeling RGB pixels overlaying a guard and/or sense area of a touch-sensitive module with a first model and RGB pixels overlaying a drive area of a touch-sensitive module with a second model may be generally used in various embodiments.

Figure 5A:
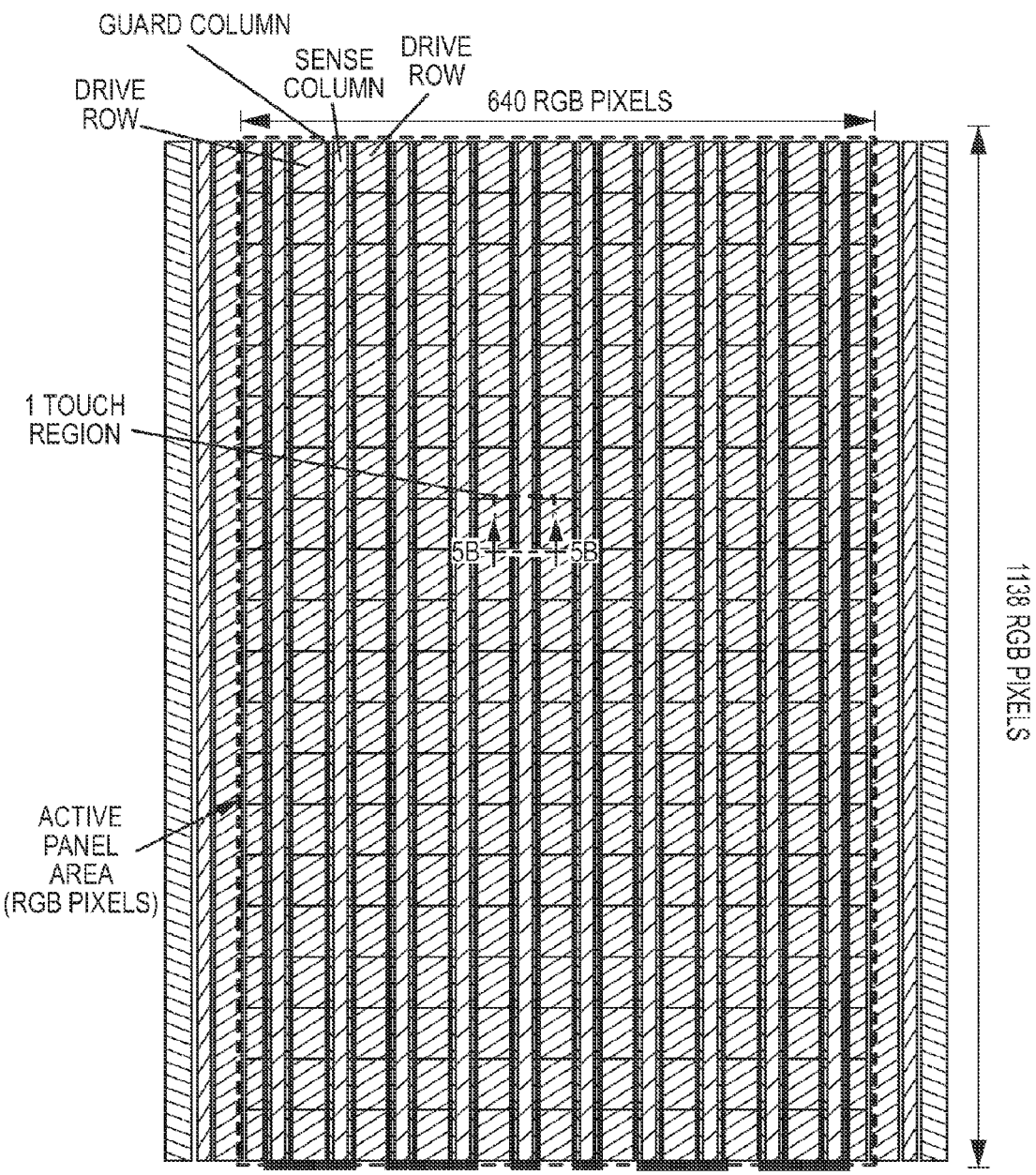
FIG. 5A depicts a top-down view of a typical touch-sensing module, which each of the areas labeled.

Generally, the touch-sensing module may be split into different areas of operation. A standard touch-sensing module may include a set of drive areas, a set of sense areas and a set of guard areas. FIG. 5A depicts a top-down view of a typical touch-sensing module, which each of the areas labeled. Essentially, the touch-sensing module may be divided into a series of regions defined by the intersection of drive rows and sense columns. The touch-sensing module may include a number of drive rows, sense columns and guard columns interleaved with one another. Guard columns typically separate adjacent portions of the drive rows and sense columns.

In operation, the drive columns are driven to a voltage. A touch at or near a particular region of the drive column attenuates the capacitance between the drive row and sense column in the region touched. By sensing the attenuation of the capacitance, the location of the touch may be determined.

Figure 5B:
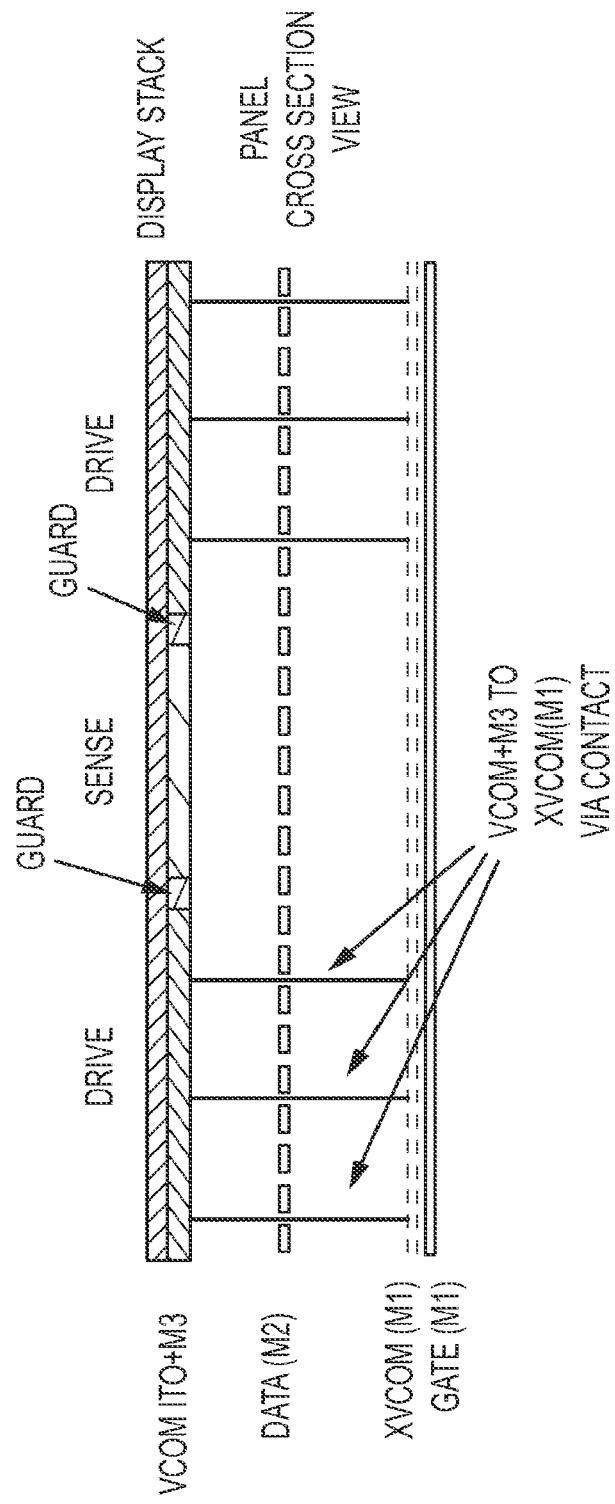
FIG. 5B shows a cross-section of the touch-sensing module of FIG. 5, taken along lines 5B-5B of FIG. 5A.

It should be appreciated that the rows and columns may be defined on separate planes in some embodiments, or may be generally co-planar in other embodiments. FIG. 5B shows a cross-section of the touch-sensing module of FIG. 5A, taken along lines 5B-5B of FIG. 5A. As can be seen, the drive row and sense column are co-planar. Segments of the drive row are connected to one another through the XVCOM metal layer; traces run from each drive row segment to the XVCOM metal layer. The traces are routed along the XVCOM metal layer from one drive row segment to the next. This permits the drive row segments to function as a single, unitary row while maintaining a co-planar relationship with the sense columns.

As also shown in FIG. 5B, a display stack overlies, and is adjacent to, the touch-sensing module. The display stack may include not only a liquid crystal display, but also a polyamide positioned between the display and the touch-sensing module. The display itself may be formed from a variety of layers, including a cover glass, adhesive (such as a pressure-sensitive adhesive), one or more polarizers, one or more color filters, one or more glass layers, a liquid crystal layer, and the like. Generally, the display stack abuts the touch-sensitive module, but in alternative embodiments an air gap may be present between the two. In this embodiment, the actual display itself (e.g., the RBG pixels of the display) may be interspersed or otherwise in-plane with the touch regions of the touch-sensing module.

In order to determine the parasitic effect of a display pixel or sub-pixel capacitance on a region of a touch-sensitive module, the operation of a touch region may be modeled. In particular, a model may be generated to employ first order estimation of the touch-sensing module's bandwidth and also cross-talk effects from the display to the touch-sensing module.

Figure 6A:
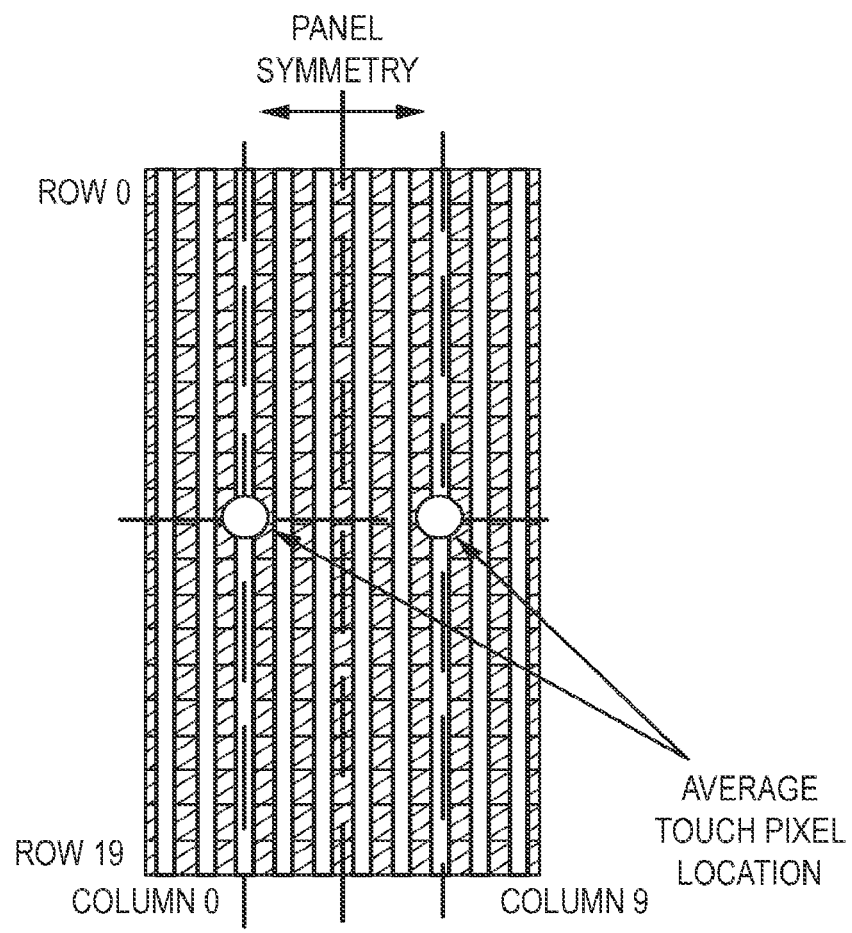
FIG. 6A generally depicts the location of an average touch pixel on a touch-sensing module.
Figure 6B:
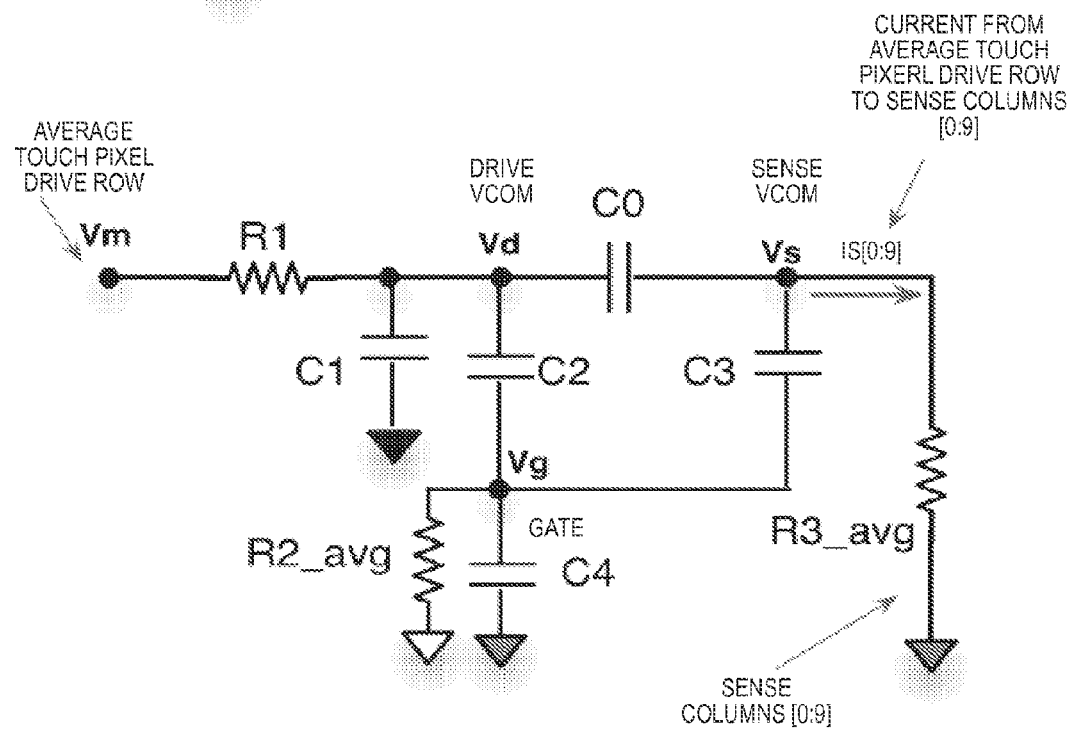
FIG. 6B generally depicts a simplified model of an average or standard touch region as an RC network. Various grounds are labeled on the figure, as are various voltages.

FIG. 6B generally depicts a simplified model of an average or standard touch region as an RC network. In particular, the touch region model of FIG. 6B models the capacitances and resistances for an average touch region, which may be defined as the touch region at (or closest to) the midpoint of each side of the touch-sensing module, where a side of the module is defined by halving the panel along a major axis, as shown in FIG. 6A.

In the model of FIG. 6B, three major nodes are shown. These nodes include the Drive VCOM node, representing the VCOM layer of a single drive row of the touch-sensing module, the Sense VCOM node, representing the VCOM layer of a sense column, and the GATE node, representing the gate of a single drive row. Together, the nodes may be used to construct the model of FIG. 6A, which approximates the average transfer function of the touch-sensing module from the drive rows to the sense columns.

Generally, the average transfer function from a single drive row of the touch-sensing module to a single sense column of the module (referred to as "CSIG_AVG"). This includes a pure capacitive coupling going through C0 capacitance (as shown in FIG. 6B) and coupling through the gate line (denoted by Vg in FIG. 6B) via the C2 and C3 capacitances. The overall coupling may be expressed as follows:

$$\text{CSIG\_AVG} \approx \frac{I_s}{V_m} \approx \left(\frac{s}{\text{TOUCH\_COLS}}\right) \quad \text{EQ. 3-1a}$$

$$\left(\frac{C_0(1 + sR_{2\_avg}(C_2 + C_3 + C_4)) + sR_{2\_avg}C_2C_3}{\text{DEN}}\right)$$

$$\text{DEN} = 1 + (R_1(C_1 + C_2) + R_{2\_avg}(C_2 + C_3 + C_4) + R_{3\_avg}C_3)$$
$$s + (R_1C_1R_{2\_avg}(C_2 + C_3 + C_4) + R_1C_2R_{2\_avg}(C_3 + C_4) +$$
$$R_1(C_1 + C_2)R_{3\_avg}C_3 + R_{2\_avg}(C_2 + C_4)R_{3\_avg}C_3)s^2 +$$
$$R_1R_{2\_avg}R_{3\_avg}(C_1C_2C_3 + C_1C_3C_4 + C_2C_3C_4)s^3$$

$$\text{CSIG\_AVG} \approx \frac{I_s}{V_m} \approx \left(\frac{s}{\text{TOUCH\_COLS}}\right) \quad \text{EQ. 3-1b}$$

$$\left(\frac{C_0(1 + sR_{2\_avg}(C_2 + C_3 + C_4)) + sR_{2\_avg}C_2C_3}{1 + s\left(\begin{array}{c}R_1(C_1 + C_2) + \\ R_{2\_avg}(C_2 + C_3 + C_4) + R_{3\_avg}C_3\end{array}\right)}\right)$$

(First Moment *Approx.*)

CSIG_C0_AVG = Pure Capacitive path of CSIG_AVG ≈    EQ. 3-1c $$\frac{sC_0(1 + sR_{2\_avg}(C_2 + C_3 + C_4))}{1 + s\left(\begin{array}{c}R_1(C - 1 + C_2) + \\ R_{2\_avg}(C_2 + C_3 + C_4) + R_{3\_avg}C_3\end{array}\right)}$$

CSIG_CC_AVG =    EQ. 3-1d
RC Coupling path of CSIG_AVG through GATE ≈

$$\frac{sR_{2\_avg}C_2C_3}{1 + s\left(\begin{array}{c}R_1(C_1 + C_2) + \\ R_{2\_avg}(C_2 + C_3 + C_4) + R_{3\_avg}C_3\end{array}\right)}$$

$$\text{CSIG\_ZERO} \approx \frac{1}{2\pi R_{2\_avg}\left(C_2 + C_3 + C_4 + \frac{C_2C_3}{C_0}\right)} \quad \text{EQ. 3-1e}$$

$$\text{CSIG\_POLE} \approx \quad \text{EQ. 3-1f}$$
$$\frac{1}{2\pi(R_1(C_1 + C_2) + R_{2\_avg}(C_2 + C_3 + C_4) + R_{3\_avg}C_3)}$$

$$\text{CSIG\_SENSE\_ZERO} \approx \frac{1}{2\pi(r_{2\_avg}(C_2 + C_3 + C_4))} \quad \text{EQ. 3-1g}$$

$$\text{DRIVE\_TC} \approx R_1(C_1 + C_2) + R_{2\_avg}C_2 \quad \text{EQ. 3-1h}$$

$$\text{GATE\_TC} \approx R_{2\_avg}(C_2 + C_3 + C_4) + R_1C_2 + R_{3\_avg}C_3 \quad \text{EQ. 3-1i}$$

$$\text{SENSE\_TC} \approx R_{3\_avg}C_3 + R_{2\_avg}C_3 \quad \text{EQ. 3-1j}$$

where
$s$ = Laplace variable
$V_m$ = Touch-sensing module AC Input into Touch Drive Row
$I_s$ = Average AC current output into a Single Touch Sense Column from Single Drive Row
$R_1$ = Average Drive Row Resistance from the *avearge* Touch Pixel pixel location to AC ground
$R_{2\_avg}$ = Average Drive Row GATE line resistance to AC ground
$R_{3\_avg}$ = Average Sense resistance for all Columns seen by a Drive Row
$C_0$ = Drive Row VCOM coupling to all Sense Column
$C_1$ = Average Drive Row VCOM Capacitive Loading to AC Grounded DATA line in the Drive Regions due to Differential *Mutltistim*
$C_2$ = Drive Row VCOM Capacitive Coupling to its *assocated* GATE lines
$C_3$ = All Sense Column VCOM Capacitive Coupling to GATE lines of a single Drive Row
$C_4$ = Capacitive Couplings of DATA lines (AC Grounded) to GATE lines in a singleDrive Row The CSIG_ZERO value is the estimate of the frequency at which CSIG_AVG has a frequency response peak at approximately −3 dB above the direct DC value of CSIG_AVG. Similarly, CSIG_SENSE_ZERO is an estimated frequency of a pure capacitive path coupling a drive row to a sense column (e.g., (CSIG_CO_AVG)) having a frequency response peak of approximately −3 dB above the DC for the pure capacitive path of CSIG_AVG. CSIG_POLE represents the 3 dB frequency where CSIG_AVG starts to attenuate with respect to frequency.

Given the foregoing, a simplified model of the display to touch-sensing module cross-capacitance (DTX) may be generated. DTX is one example of a parasitic capacitance induced in the capacitive touch-sensing module by the display. Generally, there are two main components of the DTX effect: parasitic capacitance due to the display pixel TFT; and parasitic capacitance due to the state of the liquid crystals in the liquid crystal display panel of the display. The effect of the pixel parasitic capacitance has already been discussed.

The liquid crystal display panel generally controls light transmittance through the display. When a voltage is applied to a liquid crystal, the crystal untwists and passes light. When no charge is applied, the crystal is twisted and light is blocked from passing therethrough. Thus, the liquid crystal layer acts to control the amount of light that is transmitted through the display from the backlight. The liquid crystals may vary the amount of light they pass; they are not necessarily fully transmissive or fully opaque. Likewise, light may be passed through a relatively small portion of the display by controlling operation of the liquid crystals associated with that area. Light may be passed through only the liquid crystals associated with a single pixel, for example.

White and black display colors tend to increase and decrease (respectively) the parasitic capacitance of associated display pixels. In particular, the parasitic capacitance of the Cgate_pixel and Cgate_data parasitic capacitances, as shown in FIG. 3. These parasitic capacitances, in turn, may increase and decrease (respectively) the drive to sense capacitive coupling of the capacitive touch-sensing module. Other parasitic capacitances may likewise play a role, depending on the process and layout of the display pixel TFTs, but it is believed that these two parasitic capacitances exert the greatest influence on the operation of the touch-sensing panel.

General empirical testing and panel simulation has identified that CSIG_AVG, along with deviations due to DTX, are larger for drive rows that are physically located furthest away from the display integrated circuitry (IC). Furthermore, such deviations of a first order approximation are a linear function of the drive row positioning (e.g., distance from the display IC) and show relatively small linear deviation.

Figure 7A:
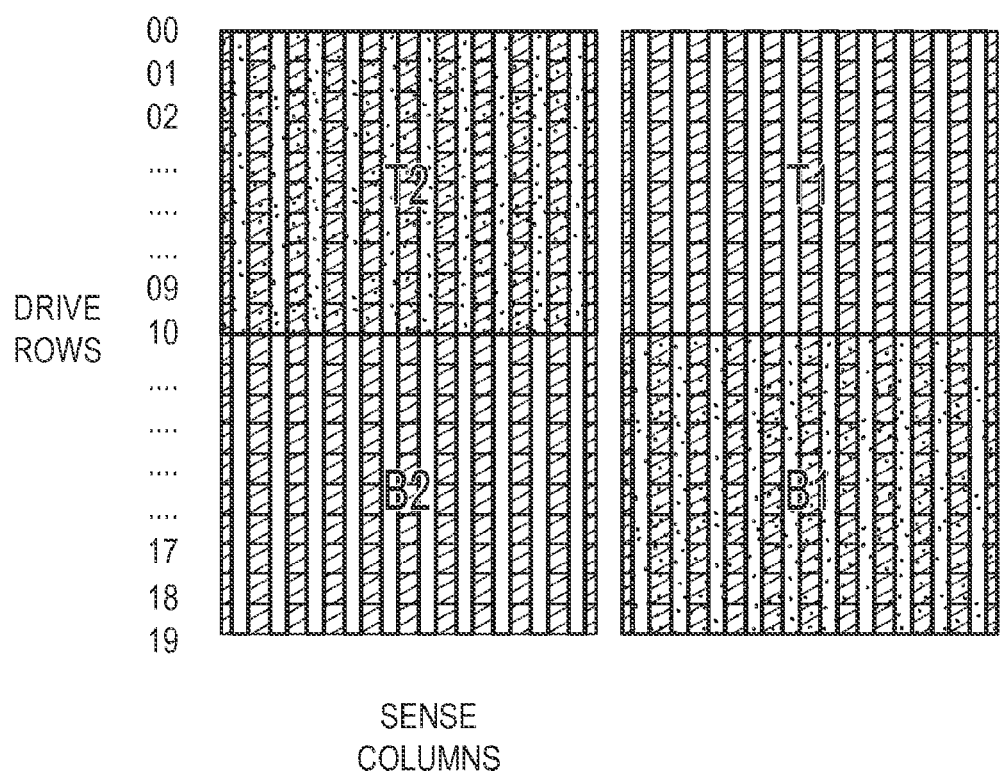
FIG. 7A shows the drive rows and sense columns of a sample capacitive touch-sensing display module (not to scale) with a black and white pattern of a display overlaid on the module.
Figure 7B:
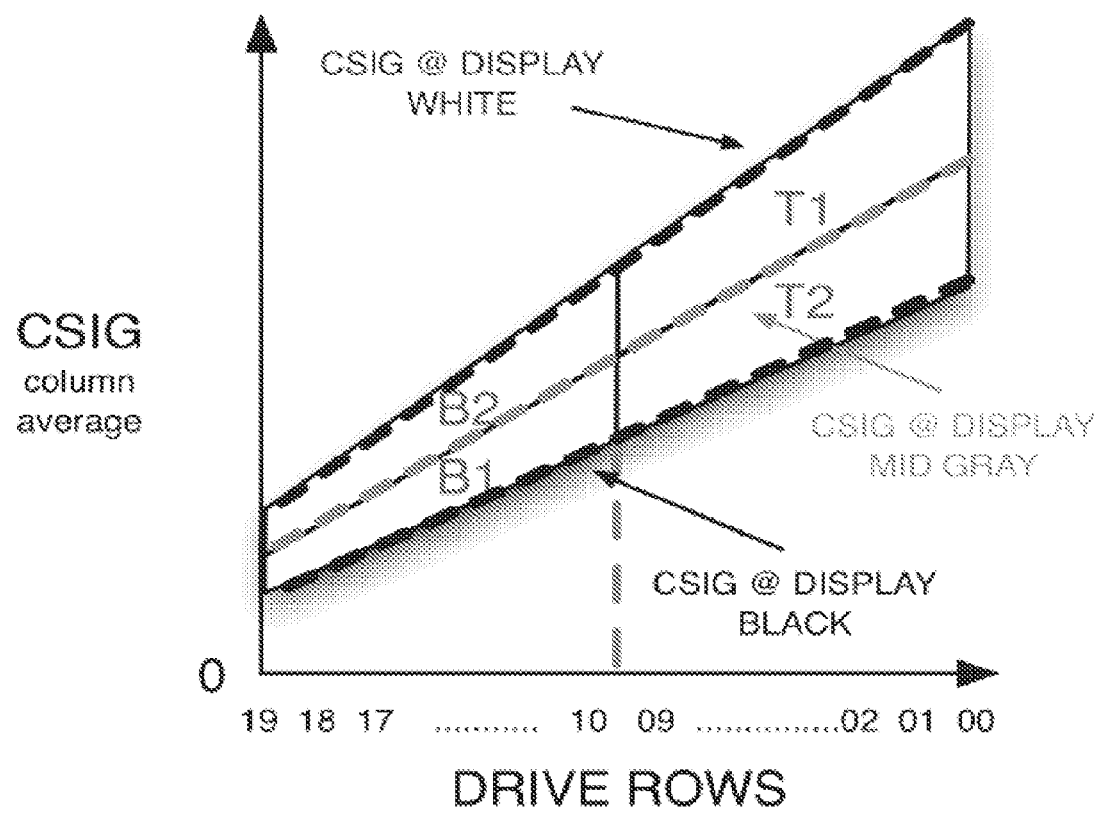
FIG. 7B shows the transfer function from drive to sense (CSIG) for the various quadrants of the touch-sensing module, when the display shown the black and white pattern of FIG. 7A.
Figure 7C:
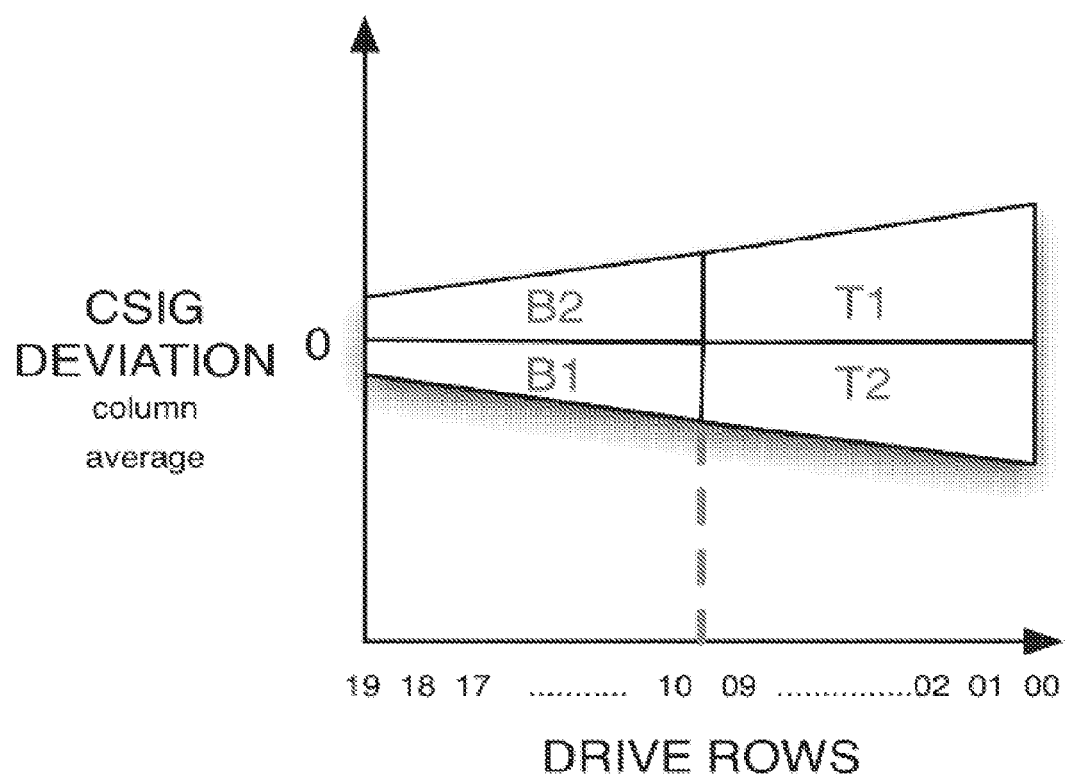
FIG. 7C depicts the CSIG deviation for each drive row when the display shows a standard gray image.
Figure 7D:
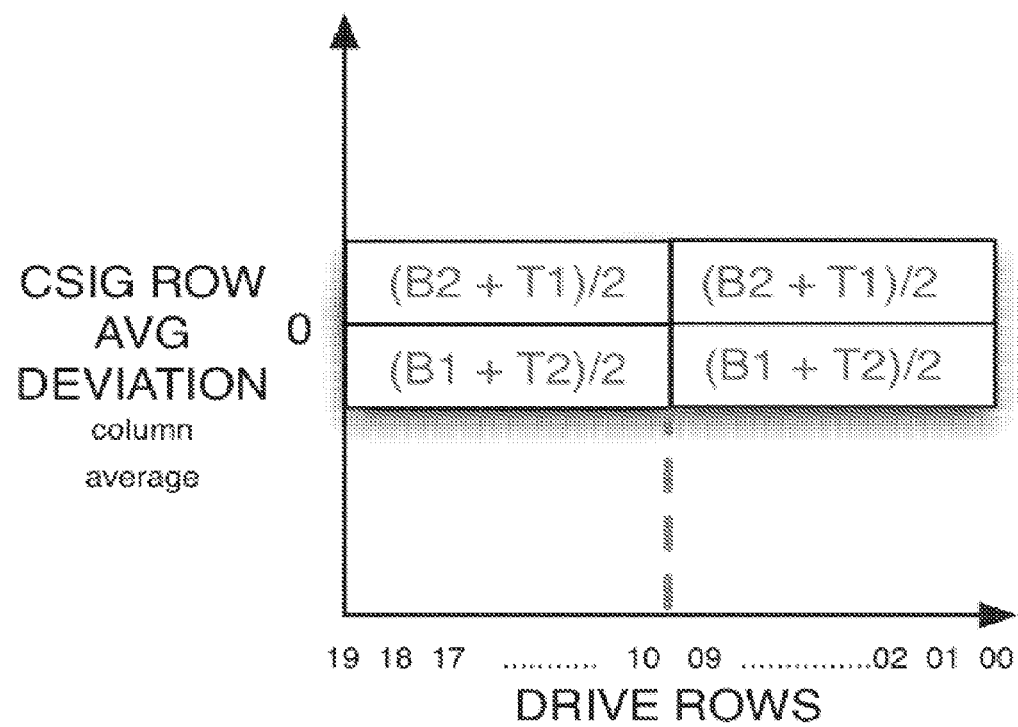
FIG. 7D depicts a row-averaged deviation for CSIG, for each drive row from a baseline when the display shows a standard gray image.

To quantify DTX, the differential value of the CSIG deviations may be scaled with respect to the average full scale of the touch-sensing module, as shown in FIGS. 7A-7D. FIG. 7A shows the drive rows and sense columns of a sample capacitive touch-sensing display module (not to scale) with a black and white pattern of a display overlaid on the module. FIG. 7B shows the transfer function from drive to sense (CSIG) for the various quadrants of the touch-sensing module, when the display shown the black and white pattern of FIG. 7A. FIG. 7C depicts the CSIG deviation for each drive row when the display shows a standard gray image. Finally FIG. 7D depicts a row-averaged deviation for CSIG, for each drive row from a baseline when the display shows a standard gray image. Generally, the magnitude of DTX may be expressed as follows:

Top/Bottom $DTX$ Magnitude (percent) $\approx$   EQ. 4-1b $$100 \times \frac{1}{2}\left(\frac{2\pi f_{stim} R_{2\_avg}}{\text{TOUCH\_COLS} \times \text{CSIG\_SENSE}}\right)$$

$(C_3 \Delta C_2 + C_2 \Delta C_3)$ assuming for typical case CSIG_SENSE_ZERO $>> f_{stim}$ where $R_{2\_avg} =$ Average Drive Row GATE line resistance to AC Ground (Elmore Approximation of models in Figure 10a & b)

$C_2 =$ Drive Row $VCOM$ Capacitive Coupling to its *assocated* GATE lines $C_3 =$ All Sense Column $VCOM$ Capacitive Coupling to GATE lines of a single Drive Row $C_4 =$ Capacitive Couplings of DATA lines (AC Grounded) to GATE lines in a single Drive Row CSIG_SENSE = Touch Full Scale for single Touch Pixel $\Delta C_2 =$ Change in Capacitance of $C2$ when PIXEL voltages changes between White & Black Color setting.

$\Delta C_3 =$ Change in Capacitance of $C3$ when PIXEL voltages changes between White & Black Color setting.

$$\text{CSIG\_SENSE\_ZERO} \approx \frac{1}{2\pi(R_{2\_avg}(C_2 + C_3 + C_4))}$$

$f_{stim} =$ Touch Stimulation Frequency

After further manipulation, the relationship between DTX and the display panel parameters may be expressed as follows:

Top/Bottom $DTX$ Magnitude (percent),   EQ. 4-1.1a $$\text{TB\_DTX\_MAG} \approx 100 \times \frac{1}{2}\left(\frac{2\pi f_{stim} R_{2\_avg}}{\text{CSIG\_SENSE}_{RGB}}\right) \times$$

$$AA \times BB \times \text{DISPLAY\_COLS} \times C_{2\_RGB} \times$$

$$C_{3\_RGB} \times \left\{\frac{\Delta C_{2\_RGB}}{C_{2\_RGB}} + \frac{\Delta C_{3\_RGB}}{C_{3\_RGB}}\right\}$$

for CSIG_SENSE_ZERO $>> f_{stim}$

TB_DTX_R2_avg = $R_{2\_avg}$   EQ. 4-1.1b

TB_DTX_C2_RGB = $C_{2\_RGB}$   EQ. 4-1.1c

TB_DTX_C2_RGB = $C_{3\_RGB}$   EQ. 4-1.1d $$\text{TB\_DTX\_Cgate\_pixel} = \frac{\Delta \text{TB\_DTX\_MAG}}{\Delta \text{Cgate\_pixel}}$$   EQ. 4-1.1e $$\text{TB\_DTX\_Cgate\_vcom} = \frac{\Delta \text{TB\_DTX\_MAG}}{\Delta \text{Cgate\_vcom}}$$   EQ. 4-1.1f $$\text{TB\_DTX\_Cgate\_data} = \frac{\Delta \text{TB\_DTX\_MAG}}{\Delta \text{Cgate\_data}}$$   EQ. 4-1.1f where $$R_{2avg} = \left\{\left(\frac{R\_gate}{4}\right) \times \text{DISPLAY\_COLS} + R\_on\_TFT + \left(\frac{R\_vgl}{2} + R\_vgl\_base\right) \times \left(\frac{\text{DISPLAY\_ROWS}}{2}\right)\right\}$$

$$\text{CSIG\_SENSE}_{RGB} = \frac{\text{CSIG\_SENSE}\left(\frac{1}{\text{TOUCH\_Y}}\right)}{\text{TOUCH\_X} \times \text{TOUCH\_Y}}$$

$$AA = \frac{2 \times \text{DRV\_X}}{\text{TOUCH\_X}}$$

$$BB = \frac{\text{SEN\_X}}{\text{TOUCH\_X}}$$

typically Cdata_pixel,

Cgate_pixel<< Cvcom_pixel $C_{2\_RGB} \approx 3(\text{Cgate\_vcom} + \text{Cgate\_pixel})$ $C_{3\_RGB} \approx 3\Big(\text{Cgate\_vcom} + \text{Cgate\_pixel} +$ $$\frac{\text{Cgate\_data} \times (\text{Cdata\_vcom} + \text{Cdata\_pixel})}{\text{Cgate\_data} + \text{Cdata\_vcom} + \text{Cdata\_pixel}}\Big)$$

$\Delta C_{2\_RGB} \approx 3(\Delta \text{Cgate\_vcom} + \Delta \text{Cgate\_pixel})$ $\Delta C_{3\_RGB} \approx$ $3\Big(\Delta \text{Cgate\_vcom} + \Delta \text{Cgate\_pixel} + \Delta \text{Cgate\_data} \times$ $$\left(\frac{\text{Cdata\_vcom} + \text{Cdata\_pixel}}{\text{Cgate\_data} + \text{Cdata\_vcom} + \text{Cdata\_pixel}}\right)^2\Big)$$

$\Delta$Cgate_vcom = Change in Sub-Pixel Capacitance of

Cgate_vcom when PIXEL voltages changes between White & Black Color setting.

$\Delta$Cgate_pixel = Change in Sub-Pixel Capacitance of

Cgate_pixel when PIXEL voltages changes between White & Black Color setting.

$\Delta$Cgate_data = Change in Sub-Pixel Capacitance of

Cgate_data when PIXEL voltages changes between White & Black Color setting.

This may be further simplified by applying certain assumptions regarding the parasitic capacitance of the display pixel. Specifically, one may assume that the capacitance cgate_data is much less than the capacitance (Cdata_vcom+ Cdata_pixel). In essence, the foregoing may be simplified to the following:

$$\text{TB\_DTX\_MAG} \approx 100 \times \frac{1}{2} \qquad \text{Top/Bottom } DTX \text{ magnitude (percent),} \qquad \text{EQ. 4-1.1h}$$

$$\left(\frac{2\pi f_{stim}}{(CSIG\_SENSE_{RGB})}\right) \times AA \times BB \times \text{DISPLAY\_COLS} \times$$

$$\left\{\left(\frac{R\_gate}{4}\right) \times \text{DISPLAY\_COLS} + R\_on\_TFT + \right.$$

$$\left. \left(\frac{R\_vgl}{2} + R\_vgl\_base\right) \times \left(\frac{\text{DISPLAY\_ROWS}}{2}\right)\right\} \times$$

$$9 \times (Cgate\_vcom + Cgate\_pixel) \times$$

$$\left\{\left(2 + \frac{Cgate\_data}{(Cgate\_vcom + Cgate\_pixel)}\right) \times \right.$$

$$\left. (\Delta Cgate\_vcom + \Delta Cgate\_pixel) + \Delta Cgate\_data\right\}$$

for the case where also Cgate_data $$\ll Cdata\_vcom + Cdata\_pixel$$

Thus, it can be seen that changes in the parasitic capacitances of the touch-sensing module that are due to the display pixel are a function of the biasing voltages of the GATE, PIXEL, and DATA nodes of the pixel. Thus, it may be presumed that shielding the capacitive touch-sensing module from these biasing voltages may significantly reduce the parasitic capacitance and thus improve the sensitivity and function of the module.

Figure 8:
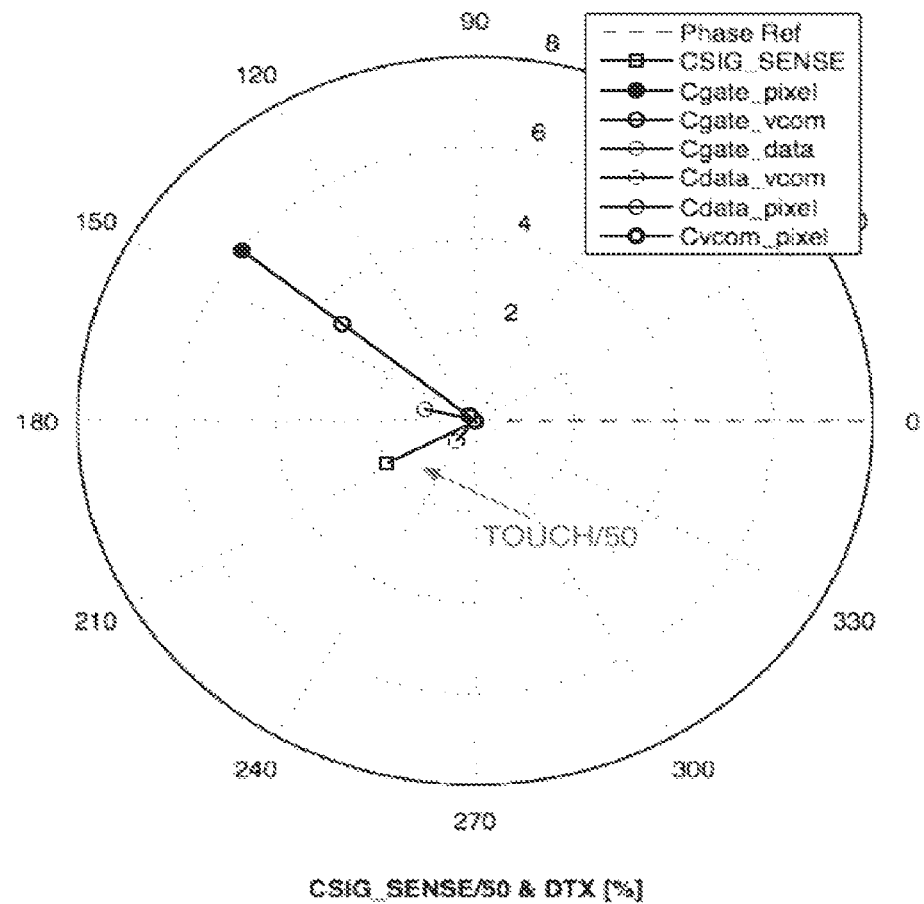
FIG. 8 generally shows the various capacitances as phasors.

FIG. 8 generally shows the various capacitances as phasors. It may be appreciated from this figure that the most dominant component of DTX (e.g., the component to which the touch-sensing module is most sensitive) is the Cgate_pixel parasitic capacitance of a display pixel. The next greatest effect on DTX is the Cgate_vcom parasitic capacitance of a display pixel.

As previously mentioned, the liquid crystal display (LCD) panel of the display may also exert a parasitic capacitance on the touch-sensing module. Further, the transmittance of the liquid crystals' may amplify or reduce the parasitic capacitance associated with a display pixel. Given the dominance of the display pixels' parasitic capacitance and the interrelationship of the LCD panel effects to that of the display pixels, modification of the parasitic capacitance exerted by the display crystals is generally sufficient to reduce parasitic capacitive coupling to the touch-sensing module. Accordingly, the effect of the LCD panel is not discussed in further detail herein.

Having identified the largest cause of parasitic capacitance effects on the capacitive touch-sensing module, it may be useful to determine how to mitigate these effects. Modeling the entire display as a series of RC networks, each corresponding to an individual pixel, is extremely complicated and processor-intensive. Accordingly, even given a layout of the display panel and touch-sensing module and appropriate capacitance modeling software, it may be desirable to simplify the RC network models discussed above.

Figure 9:
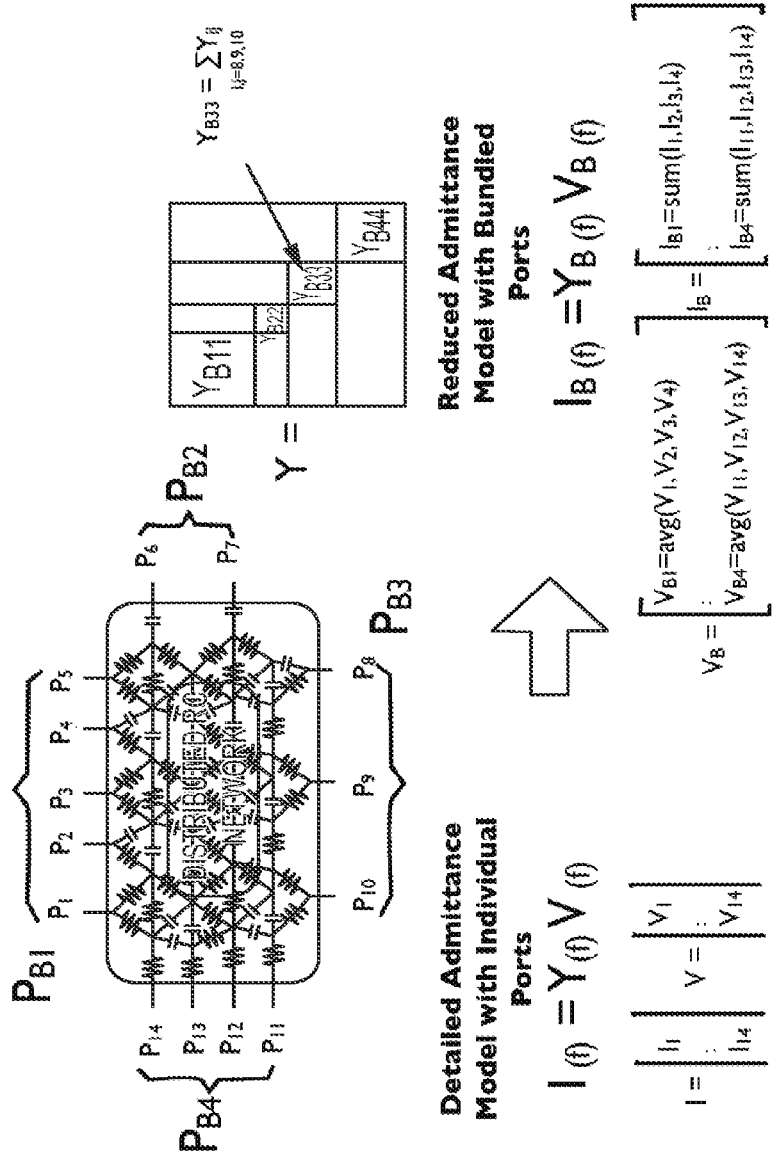
FIG. 9 depicts an admittance model that may be generated from an RC network model for a display panel.

FIG. 9 depicts an admittance model of an RC network representing a display made of a plurality of individual pixels. As can be seen, the admittance model (on the right side of FIG. 9) is greatly simplified from the RC model (on the left side of FIG. 9). Such simplification permits more rapid calculation of the effects of changing certain pixel-level capacitances (examples of which are shown in FIGS. 3, 4A and 4B) on the DTX of the touch-sensing module.

Given the admittance modeling, a scheme may be generated to quickly and efficiently translate modeling results into an analysis algorithm. This algorithm may be performed on a computing device running MATLAB or a similar program. This permits the active parasitic capacitances to be displayed in a non-nominal fashion. Variations in parasitic capacitances may be measured and the effect of changing these capacitances may likewise be measured.

The model of the panel may include multiple simulation points that permit a user to vary parasitic capacitances. By varying these capacitances, such as the ones discussed above with respect to FIGS. 3, 4A and 4B, the overall effect of DTX on the touch-sensing module may be more easily measured. In particular, varying these capacitances may permit a user to quickly and efficiently determine which capacitances have a greater or lesser effect on DTX, thereby permitting the user to focus on areas where underlying physical features may be changed in order to change an associated capacitance.

For example, with respect to a pixel TFT, parasitic capacitances may be changed by changing the doping of certain regions of the pixel. Likewise, capacitances may be changed by varying the shielding of certain regions and/or physical structure and/or layers of the TFT. The admittance model permits relatively rapid and efficient analysis of such changes, which may lead o modifications in the masking process used to manufacture the pixel TFT and ultimately, the display itself in order to minimize or reduce the DTX effects on an associated capacitive touch-sensing panel.

The techniques discussed herein may be used not only to identify certain parasitic capacitances and their effect on a capacitive touch-sensing module, but also to modify certain parameters of the display pixels themselves in order to reduce parasitic capacitance. Examples of such modifications may be found in U.S. patent application Ser. No. 13/601,535, filed Aug. 31, 2012 and titled "Two Doping Regions in Lightly Doped Drain for Thin Film Transistors and Associated Doping Processes," and U.S. Provisional Patent Application Ser. No. 61/698,455, filed Sep. 7, 2012, titled "Hydrogenation and Crystallization of Polycrystalline Silicon," both of which are incorporated herein in their entireties.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims. The foregoing description has broad application. Accordingly, the discussion of any embodiment is meant only to be an example and is not intended to suggest that the scope of the disclosure, including the claims, is limited to these examples.

What is claimed is:

1. A method for reducing an overall parasitic capacitance between a display and a capacitive touch-sensing panel, the method comprising:
   generating an admittance model of a plurality of parasitic capacitances between conductive lines that form a plurality of pixels in the display;
   varying at least one of the plurality of parasitic capacitances in the admittance model to an adjusted capacitance level;
   determining if the adjusted capacitance level reduces the overall parasitic capacitance between the display and the capacitive touch-sensing panel in the admittance model; and
   modifying at least one of the capacitive touch-sensing panel and the display such that the at least one parasitic capacitance in the display is adjusted to the adjusted capacitance level based on the admittance model.

2. The method of claim 1, wherein the overall parasitic capacitance in the admittance model is an expression of a display to capacitive touch-sensing panel cross-capacitance.

3. The method of claim 2, further comprising representing at least one of the plurality of parasitic capacitances as at least one phasor.

4. The method of claim 3, wherein representing at least one of the plurality of parasitic capacitances as at least one phasor comprises:
- representing the capacitance of a touch region in the capacitive touch-sensing panel as a first phasor; and
- representing the parasitic capacitance of a nearby display pixel in the display as a second phasor.

5. The method of claim 4, further comprising:
- comparing the magnitude of the first phasor to the second phasor; and
- determining an impact of the first phasor on the second phasor based on the comparison.

6. The method of claim 4, further comprising:
- mapping a structural change in at least one of the display and the capacitive touch-sensing panel to a change in the at least one phasor; and
- determining an effect of the structural change on the overall parasitic capacitance based on the mapping.

7. The method of claim 1, wherein modifying at least one of the capacitive touch-sensing panel and the display comprises modifying a doping characteristic of a region of a display pixel in the display.

8. The method of claim 1, wherein modifying at least one of the capacitive touch-sensing panel and the display comprises modifying shielding that shields a display pixel in the display.

9. A method for reducing a cross-capacitance between a display and a touch-sensitive component, the method comprising:
- generating an admittance model that includes a plurality of parasitic capacitance values, each of which corresponds to a given parasitic capacitance in the display;
- in the admittance model, adjusting at least one of the plurality of parasitic capacitance values;
- determining if adjusting the parasitic capacitance value decreases an overall parasitic capacitance value in the admittance model that corresponds to the cross-capacitance between the display and the touch-sensitive component; and
- adjusting the given parasitic capacitance in the display to reduce the cross-capacitance between the display and the touch-sensitive component.

10. The method of claim 9, wherein adjusting the at least one of the plurality of parasitic capacitance values comprises adjusting the at least one of the plurality of parasitic capacitance values to an adjusted parasitic capacitance value, and wherein adjusting the given parasitic capacitance in the display comprises adjusting the given parasitic capacitance in the display to the adjusted parasitic capacitance value.

11. The method of claim 10, wherein adjusting the given parasitic capacitance in the display comprises modifying a physical parameter of the display.

12. The method of claim 11, wherein adjusting the given parasitic capacitance in the display comprises modifying a doped region of a thin-film transistor in the display.

13. The method of claim 11, wherein adjusting the given parasitic capacitance in the display comprises modifying shielding that shields a pixel in the display.

14. The method of claim 9, further comprising:
- representing the at least one of the parasitic capacitance values as a phasor.

15. The method of claim 9, wherein the touch-sensitive component is integrated into the display.

16. The method defined in claim 15, wherein the display comprises pixels and the touch-sensitive component comprises a plurality of touch-sensitive regions, and wherein the pixels are interspersed with the plurality of touch-sensitive regions.

17. A method for reducing a parasitic capacitance between a display and a capacitive touch-sensing panel, the method comprising:
- generating an admittance model of a plurality of parasitic capacitances between a plurality of pixels in the display;
- representing one or more of the plurality of parasitic capacitances as one or more phasors;
- varying one or more of the plurality of parasitic capacitances in the admittance model;
- determining if the variance of the one or more of the plurality of parasitic capacitances reduces an overall parasitic capacitance between the display and the capacitive touch-sensing panel, wherein the overall parasitic capacitance is an expression of a display to touch sensing module cross-capacitance; and
- in response to determining that the variance reduces the overall parasitic capacitance, implementing the variance in at least one of the capacitive touch-sensing panel and the display.

* * * * *